United States Patent [19]

Schenk

[11] Patent Number: 4,844,678

[45] Date of Patent: Jul. 4, 1989

[54] PROCESS FOR AUTOMATICALLY FEEDING WORK STATIONS AND APPARATUS FOR PRACTICING THE PROCESS

[75] Inventor: Bernard Schenk, St-Imier, Switzerland

[73] Assignee: Arcofil S.A., St-Imier, Switzerland

[21] Appl. No.: 124,859

[22] Filed: Nov. 30, 1987

Related U.S. Application Data

[63] Continuation of Ser. No. 18,849, Feb. 24, 1987, abandoned, which is a continuation of Ser. No. 810,772, Dec. 19, 1985, abandoned.

[30] Foreign Application Priority Data

Dec. 19, 1984 [CH] Switzerland .......................... 028/84

[51] Int. Cl.⁴ .............................................. B65H 1/00
[52] U.S. Cl. ...................................... 414/226; 901/7; 901/31; 269/309; 29/563; 29/568
[58] Field of Search ................................. 414/222-225, 414/912, 226; 901/6-7, 31; 269/69-70, 309-310; 29/563, 564, 568

[56] References Cited

U.S. PATENT DOCUMENTS

| | | | |
|---|---|---|---|
| 3,895,424 | 7/1975 | Hautau | 29/563 X |
| 3,937,057 | 2/1976 | Trolle | 901/6 X |
| 3,979,985 | 9/1976 | Daniels | 901/6 X |
| 4,354,305 | 10/1982 | Plummer et al. | 29/568 |
| 4,439,090 | 3/1984 | Schaefer | 901/31 X |
| 4,545,723 | 10/1985 | Clark | 901/31 X |
| 4,662,043 | 5/1987 | Stone et al. | 29/563 X |
| 4,663,823 | 5/1987 | McMurtry | 29/568 |
| 4,711,016 | 12/1987 | Genschow et al. | 29/563 X |

FOREIGN PATENT DOCUMENTS

| | | | |
|---|---|---|---|
| 75761 | 6/1977 | Japan | 901/6 X |
| 598752 | 2/1978 | U.S.S.R. | 901/6 X |
| 2008991 | 6/1979 | United Kingdom | 901/6 X |

Primary Examiner—Robert J. Spar
Assistant Examiner—William M. Hienz
Attorney, Agent, or Firm—Young & Thompson

[57] ABSTRACT

A method of feeding a work station, which utilizes a robot to grasp workpieces one after the other at a charging station to which the workpieces are successively conducted to feed them to the work station and to transfer the workpiece worked upon to a discharging station. The robot grasps every workpiece arriving at the charging station by a workpiece holder that grasps the workpieces at a predetermined place thereon and holds them during all the time of transfer thereof and working thereon and releases the workpieces only when they arrive at the discharging station. At the work station, the workpiece holder is held in a very precise position by a gripping block rigidly fixed to a member in the work station. An apparatus for practicing this method comprises a workpiece holder adapted to the geometry of the workpieces to be processed, and a gripping block mounted on a member in the work station and arranged to receive the workpiece holder and to securely hold the same in a precise position at the work station.

10 Claims, 4 Drawing Sheets

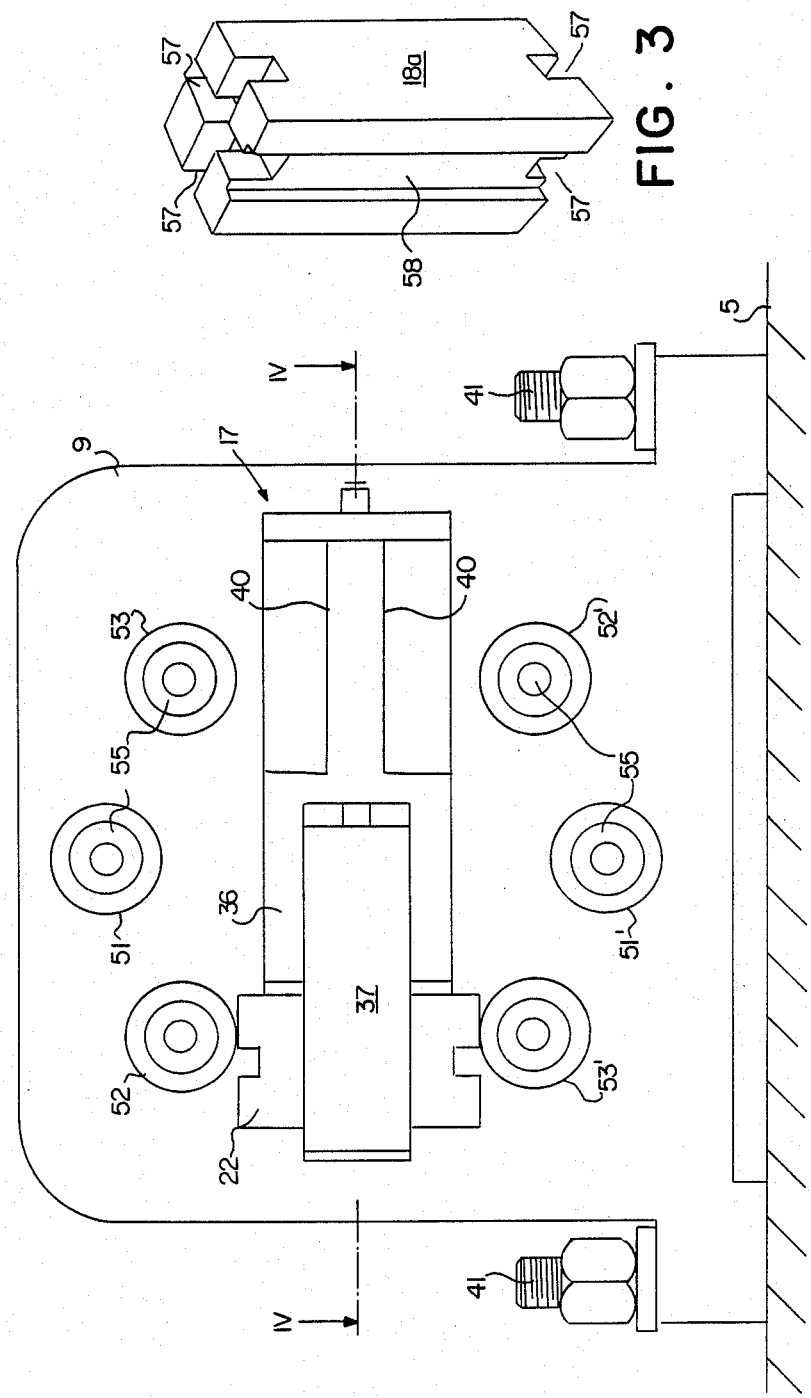

PROCESS FOR AUTOMATICALLY FEEDING WORK STATIONS AND APPARATUS FOR PRACTICING THE PROCESS

This application is a continuation of application Ser. No. 07/018,849, filed 02/24/87, now abandoned, which is a continuation of application Ser. No. 06/810,722, filed 12/19/85, now abandoned.

BACKGROUND OF THE INVENTION

1. Field of the invention

The invention relates to methods for automatically feeding work stations, more particularly to methods in which said feeding is performed by a robot. The invention also relates to apparatuses for practising these methods.

2. Description of the prior art

The automatic feeding of work stations is more and more frequently realized with the aid of robots. In the known methods and apparatuses in this field, the workpieces to be processed are grasped directly by a robot one after the other and conducted from a charging station to a work station, where the robot successively deposits the workpieces of a series in a holding device of the work station. The holding device provided at the work station comprises gripping and positioning means capable of strongly holding the workpieces in a precise position. At the end of processing a workpiece the work station releases this workpiece; the robot retakes it and possibly conveys it to another work station, before conducting the processed workpiece to a discharging station.

According to the nature of the workpieces to be processed and to the arrangement of the holding device of the work station, which must especially be designed to receive these workpieces, it may be uneasy to adjust a robot so that it presents the workpieces to be processed to the holding device of the work station in the exact position for the processing to be carried out, in particular when this position must be very precise. Moreover, such a holding device can receive the workpieces to be processed only in a well determined orientation so that, in principle, only one and the same face of the workpieces will be exposed to the processing means of the work station. If the workpieces are to be processed on different faces, which can possibly be located all round the workpieces, the latter must be conducted successively to different work stations, thus necessitating an equipment that is both bulky and costly, often slowing production.

The most serious inconvenience of the known methods and apparatuses appears when the work station forms part of a machine tool processing by means of cutting tools which produce chips. In such cases, the holding devices above mentioned are obviously located in the chip flow. Although evacuation jets for the chips are provided with the last mentioned type of working stations, these jets do not always eliminate all the chips from the holding devices. Now, it will be observed that the presence of only one chip in the holding device leads to a wrong position of the workpiece set therein and consequently to a perturbation of the processing.

SUMMARY OF THE INVENTION

The invention chiefly aims to overcome the above mentioned shortcomings and inconveniences.

It is therefore an object of the invention to grasp a well determined place of the workpieces to be processed by means of a workpiece holder removably held by the robot, to cause then the robot to convey the workpiece holder together with the grasped workpiece to a work station, to locate the workpiece holder on a gripping block and to finally cause this gripping block to firmly grip the workpiece holder and to hold the same in a precise position with respect to the work station during processing the workpiece.

Further objects of the invention will become apparent to those skilled in the art in the course of the following description.

BRIEF DESCRIPTION OF THE DRAWINGS

Two embodiments of the apparatus according to the invention are represented diagrammatically and simply by way of example in the accompanying drawings, from which different examples of practising the method according to the invention can be deducted.

In the drawings:

FIG. 2 is a view in elevation on a larger scale of a part of FIG. 1;

FIG. 3 is a view in perspective of a finished workpiece;

DESCRIPTION OF THE PREFERRED EMBODIMENTS

Figure 1:
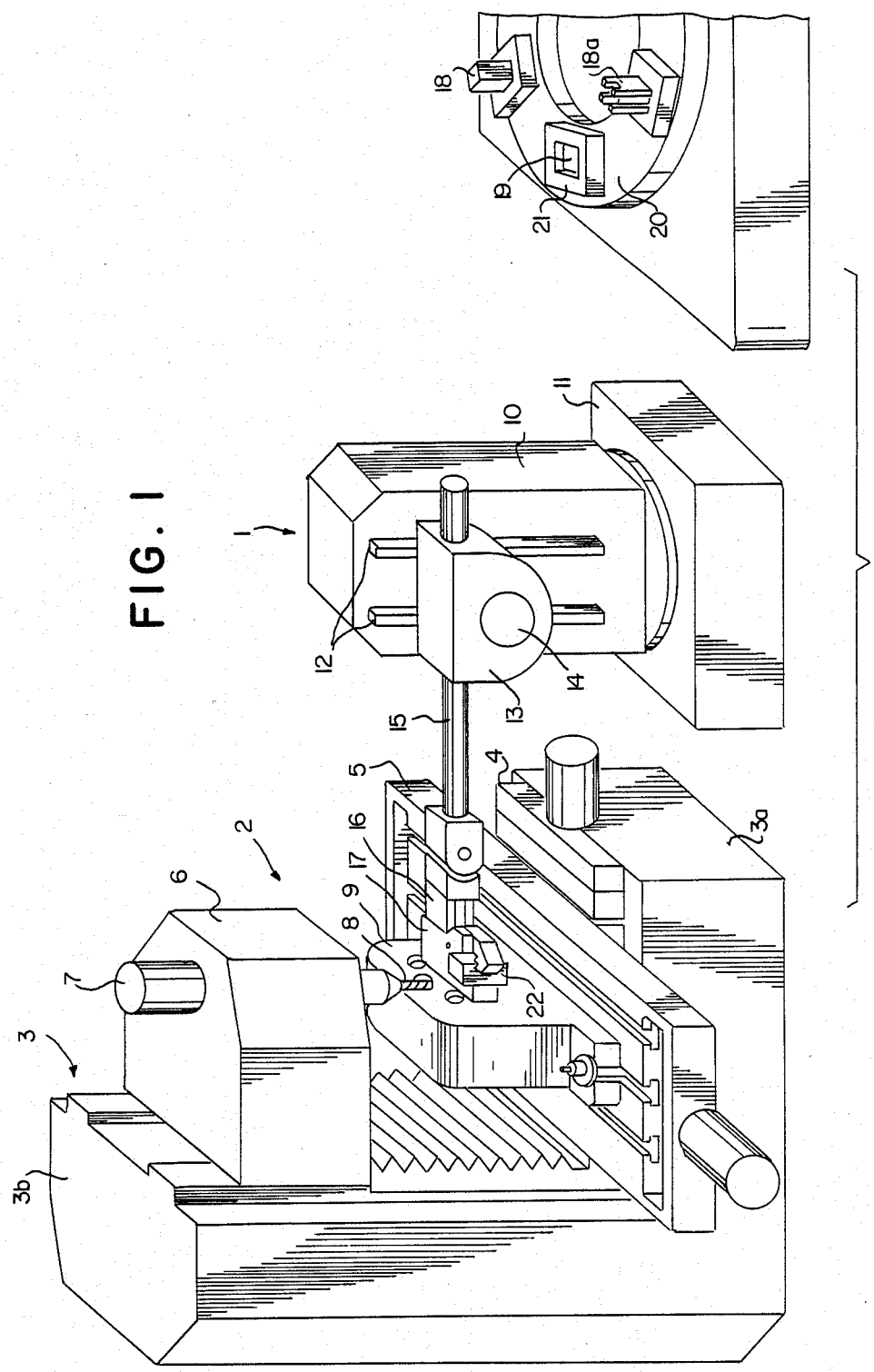
FIG. 1 is a view in perspective of the first embodiment.

In FIG. 1, the robot 1 has just fed the work station of a milling machine 2 comprising an L-shaped framework 3. On the horizontal part 3a of framework 3 is mounted a longitudinal slide 4, that may be drawn nearer or farther from the vertical part 3b of framework 3. A transverse slide 5 is mounted on slide 4 and a machining head 6 is slidably mounted on part 3b of framework 3. The machining head 6 carries a device 7 which drives a milling tool 8 in rotation. A gripping block 9, described in detail hereinafter, is rigidly fixed to slide 5.

The robot 1 comprises a body member 10 which may pivot on a base 11. Rails 12, integral with body member 10, serve to guide a block 13 which thus may be vertically displaced with respect to body member 10. The block 13 may, moreover, pivot about an arbor 14. It carries a cylindrical arm 15 which may slide along and turn about its axis in block 13. At its end, arm 15 is provided with a clamp 16. During processing a series of identical workpieces, clamp 16 may permanently hold a workpiece holder 17 described in detail hereinafter and adapted to the sizes and shape of the workpieces 18 to be processed.

In the embodiment represented in FIGS. 1 to 4, the shape of workpieces 18 has been chosen as parallelepipedal so as to simplify the explanation. Workpieces 18 are conducted the one after the other into the station shown at 19 by a chain 20 equipped with receptacles 21. In the embodiment represented, station 19 is the charging station for the workpieces 18 to be processed and also the discharging station for the processed workpieces 18a. The workpiece being at the work station of milling machine 2 has been designated by the reference numeral 22 to distinguish it from the workpieces still being in receptacles 21 of chain 20. The robot 1 has thus grasped workpiece 22 in station 19 and transferred it to the work station of the milling machine 2. When machining workpiece 22 will be complete, robot 1 will transfer the processed workpiece back to station 19, therefore also called discharging station.

Figure 4:
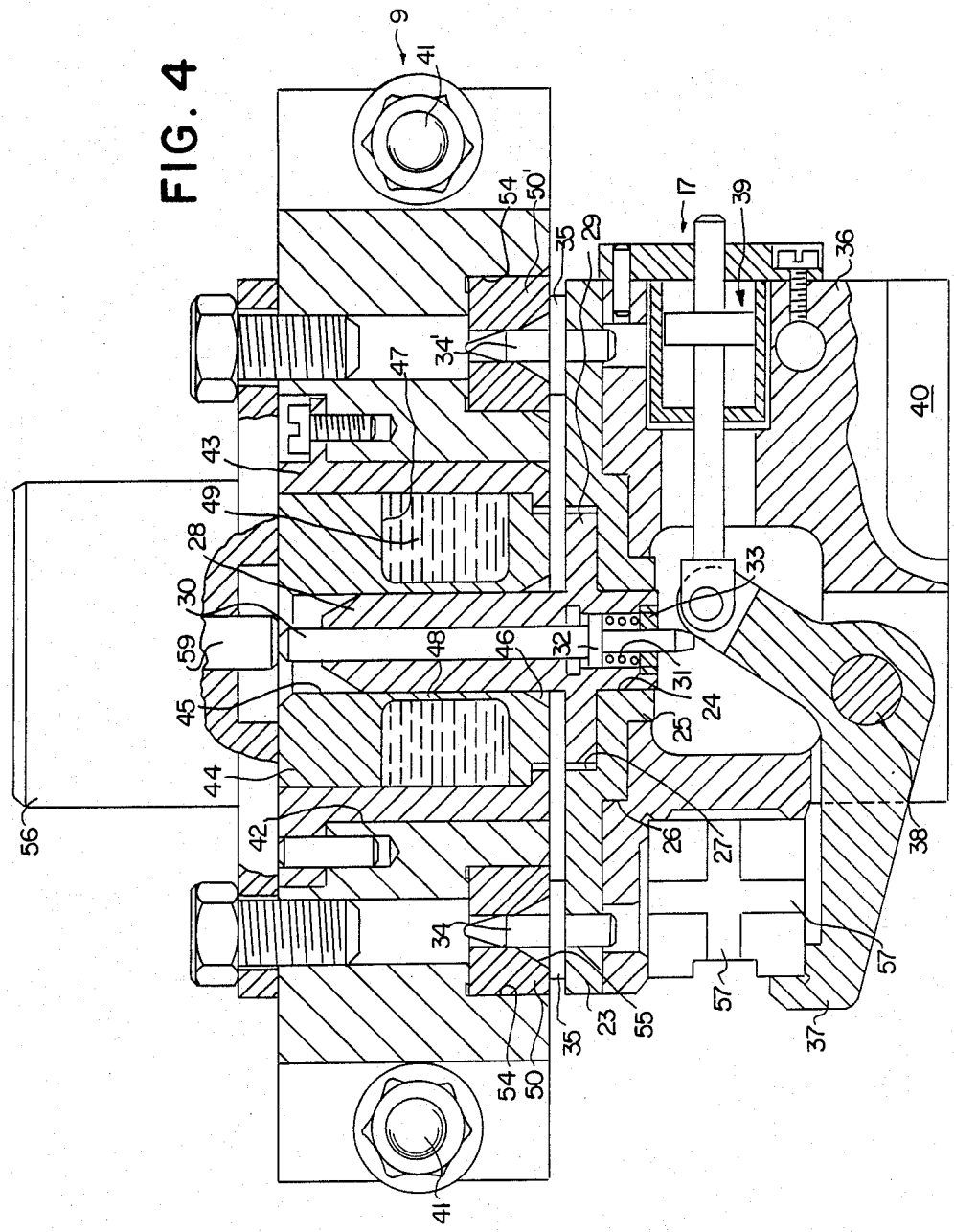
FIG. 4 is a view in section along line IV—IV of FIG. 2.

It is the assembly constituted by the gripping block 9 and the workpiece holder 17 which constitutes the novel part of the apparatus according to the invention. The various working members of this assembly are shown in FIG. 4.

The workpiece holder 17 comprises a bed plate 23 having the general form of an elongated rectangle. In the middle of this rectangle, a bore 24 is provided in bed plate 23. Bore 24 extends through projections 25 and 26 and opens in a cylindrical recess 27. A hollow cylindrical centering shaft 28, provided with a collar 29, is rigidly fixed to the bed plate 23. One end of shaft 28 is therefore engaged in bore 24 and the collar 29 is sunk in recess 27. The other end of shaft 28 is frusto-conical. A rod 30 passes through shaft 28, in which it may freely slide, but without play. Rod 30 lies under the action of a return spring 31 bent between a collar 32 of rod 30 and a guide ring 33 fixed to shaft 28. Two orienting pins 34, 34', diametrally opposed and equidistant from shaft 28 are fixed to bed plate 23 near the small edge thereof. The pins 34, 34' are formed as a single piece with an abutting collar 35.

A clamp composed of the two jaws 36 and 37 is mounted on the bed plate 23. The jaw 36 is rigidly fixed, but in detachable manner, to the bed plate 23 by screws (not shown), Positioning studs (now shown) exactly center jaw 36 on bed plate 23. Jaw 37 is jointed on jaw 36 and may be actuated in the one and the other direction about a gudgeon 38 by a double-acting (pneumatic or hydraulic) jack 39 incorporated in jaw 36. Finally, jaw 36 is provided by two indentations 40 (see also FIG. 2).

The gripping block 9 is fixed to slide 5 by two bolts 41. It is provided with a central cylindrical bore 42, in which a jacket 43 is fixed. A sleeve 44 is engaged without play in jacket 43. The bore 45 of sleeve 44 is adjusted to shaft 28. A chamfer 46 is formed at the end of bore 45 opening in the front face of the gripping block 9. An annular groove 47 is provided in the external face of sleeve 44 so that only a thin elastic wall 48 remains of sleeve 44. The groove 47 and the jacket 43 form a sealed chamber 49 filled with oil which may be set under pressure. Eight bushes 50, 50'; 51, 51'; 52, 52'; 53, 53' (FIG. 2), force-fitted in sockets 54 provided in the front face of the gripping block 9, are disposed at 45° to each other around bore 45. The bore axis of each of these bushes is at a distance from that of bore 45 which is equal to that of the axis of each of the pins 34, 34' to that of shaft 28. A chamfer 55 is formed at the opening of the bore of each of the bushes 50, 50'; 51, 51'; 52, 52'; 53, 53'. A jack 56 is mounted on the rear face of the gripping block 9.

One example of practising the method according to the invention will now be deducted from FIGS. 1 and 4. With this example, processing the workpieces 18 comprises milling two crosswise slots 57 in each of the smaller faces of workpieces 18 (FIG. 3) and a larger slot 58 in one of the longer side faces thereof. Moreover, clamp 16 of robot 1 grips the workpiece holder 17 during all the time a series of identical workpieces, such as workpiece 18, is automatically processed. For this purpose, clamp 16 engages the indentations 40 of the workpiece holder 17.

At the beginning of a processing cycle, the arm 15 of robot 1 is directed toward chain 20. Jack 39, which is controlled in a manner well known to those skilled in the art, maintains jaw 37 distant from jaw 36. The robot 1 conducts the workpiece holder 17 toward chain 20 until the free space between jaws 36, 37 lies over the workpiece which has been conducted by chain 20 into the charging station 19. The robot 1 then causes the workpiece holder 17 to descend so that jaws 36, 37 surround the workpiece being at the charging station. That descending motion of the workpiece holder under the control of robot 1 continues until jaws 36, 37 rests on the receptacle 21 being at the charging station. In that position of the workpiece holder 17, jack 39 causes jaw 37 to move toward jaw 36 until the workpiece 18 being in the charging station is firmly clamped between these jaws. The robot 1 can thus lift the workpiece clamped between jaws 36, 37 out of the receptacle 21 and direct it toward the work station of the milling machine 2. Since the receptacles 21 of chain 20 are obviously identical, it will be observed that jaws 36, 37 always clamp at the same height the workpiece of the series to be processed being at the charging station 19. In other words, every workpiece of said series will occupy exactly the same position with respect to jaws 36, 37 and consequently to the workpiece holder. The movement of the robot 1, which causes the workpiece holder 17 to transfer the grasped workpiece from the charging station to the work station, may be swift. When the workpiece holder 17 arrives near to the gripping block 9, the axes of the centering shaft 28 and the orienting pins 34, 34' will not necessarily coincide with those of the bore 45 of sleeve 44 and of the bores of bushes 50, 50' because of the imprecision of the rapid displacement of the robot 1. The offset of shaft 28 and of pins 34, 34' with respect to the corresponding bores of the gripping block 9 is, however, rather slight so that upon thrusting the workpiece holder 17 against the gripping block 9, the frusto-conical end of shaft 28 will enter at least the chamfer 46. The robot 1, of course, ensures that thrusting action by causing arm 15 to slide along its axis.

In order to permit, firstly, the frusto-conical end of shaft 28 to slide along chamfer 46 until shaft 28 enters bore 45 of sleeve 44 so as to center the workpiece holder 17 on the gripping block 9, and secondly, the conical point of pins 34, 34' to slide then along chamfers 55 of bushes 50, 50' until pins 34, 34' enter the bores of bushes 50, 50', so as to correctly orientate the workpiece holder on the gripping block 9, the controls of the rotary motions of body member 10 on base 11, of block 13 around arbor 14 and of arm 15 around its axis obviously must be interrupted, thereby allowing body member 10 to freely rotate on base 11, block 13 to do the same around arbor 14, and also arm 15 to freely rotate around its axis. Due to that control interruption of the robot 1, clamp 16 may freely follow, firstly, the possible transverse displacement of the workpiece holder 17 until shaft 28 enters bore 45 of sleeve 44, and secondly, the possible rotary motion of the workpiece holder until pins 34, 34' enter the bores of bushes 50, 50'. When shaft 28 and pins 34, 34' are fully engaged, in the manner of pegs, in the corresponding bores of sleeve 44 and bushes 50, 50', respectively, the control of the sliding motion of arm 15 is also switched off. The displacement of the workpiece holder toward the gripping block 9 under the thrusting action of robot 1 is stopped by the abutment of collars 35 against bushes 50, 50'. In this position, the oil in chamber 49 is placed under pressure by means well known to those skilled in the art. That pressure tends to deform wall 48 toward the interior of bore 45, thus very strongly squeezing shaft 28 to an extent unabling the workpiece holder 17 to escape from the gripping block 9.

All other means of removably locking the workpiece holder 17 in the axial position shown in FIG. 1 could obviously just as well be used.

Once the workpiece holder 17 has been locked to the gripping block 9, the workpiece holder 17, and consequently the workpiece 22 being at the work station are held by the gripping block 9 only, to the exclusion of the robot 1, of which the clamp 16 continues, however, to grip the workpiece holder 17, but without exerting any holding action thereon. Since the gripping block 9 is itself fixed to an element of the milling machine 2, the workpiece 22 occupies the exact position desired on the milling machine 2. The milling tool 8 thus may enter into action.

If jack 39 were not powerful enough to satisfactorily hold workpiece 22 during processing, jack 56 would be activated in a manner well known to those skilled in the art to increase the gripping effort on jaw 37 by the intermediary of rod 30. Piston 59 of jack 56 is, indeed, in contact with rod 30 and thrusts the latter against jaw 37 against the action of return spring 31.

In the position shown in FIG. 1, the milling tool 8 is going to form the two crosswise slots 57 in the upper smaller face of workpiece 22, by appropriate displacements of slides 4 and 5. As disclosed hereinabove, clamp 16 of robot 1 is allowed to freely follow the displacements that the workpiece holder 17 effects with slides 4 and 5. When the first pair of slots 57 is machined, the control of robot 1 is again switched on and, simultaneously, the pressure in chamber 49 is released. The robot 1 then somewhat moves the workpiece holder 17 away from the gripping block 9 so as to disengage the orienting pins 34, 34' from the bushes 50, 50', but not the shaft 28 from bore 45. Furthermore, robot 1 causes its arm 15 to turn through 180° around its axis, at least approximately, so as to set pin 34 opposite the bore, or at least opposite the chamfer 55 of bush 50', and pin 34' opposite the bore, or at least the chamfer 55 of bush 50.

As previously, the robot 1 then thrusts the workpiece holder 17 against the gripping block 9, the oil in chamber 49 is placed under pressure and the control of the robot is again switched off, so that clamp 16 may follow the new displacements of workpiece 22 during milling the two crosswise slots 57 on the other small face of this workpiece.

When this second milling operation is complete, the robot 1 disengages the orienting pins 34, 34' from bushes 50', 50, like previously from bushes 50, 50', and causes arm 15 to turn through 90° about its axis so as to engage now pins 34, 34' in the bores of bushes 51, 51'. In this new position, the milling tool 8 forms slot 58.

Processing workpiece 22 is thus complete. The robot 1, after its control has been switched on again, then completely disengages the workpiece holder 17 from the gripping block 9 and returns the processed workpiece over the vacant receptacle 21 at the charging and discharging station 19. The jack 39 then moves jaw 37 away from jaw 36, thus permitting the processed workpiece to fall into the vacant receptacle 21. The chain 20 then moves one step forward, so as to bring the following workpiece of the series at station 19. A new processing cycle, identical with that disclosed in detail hereinabove, thus can immediately start.

Bushes 52, 52' and 53, 53', not used in the example described, may serve to hold the workpiece holder 17 inclined at 45° according to machining operations which would have to be effected on another series of workpieces. The number of bushes, of course, could be increased so as to permit the insertion of the workpiece holder 17 in differently inclined positions, for example at 30° or at 60°.

In lieu of bore 45 and of the cylindrical shaft 28, a prismatic shaft or one of any other non-circular section could also be used and a corresponding opening be formed in sleeve 44. Although such forms are more complicated to produce than that represented and described, such a solution would have the advantage of eliminating the orienting pins 34, 34' and the corresponding bushes of the gripping block. The orientation of the work holder 17 on the gripping block 9 would, indeed, be ensured by the form itself of shaft 28 and that of the corresponding opening of sleeve 44. In that event the workpiece holder 17 could be inclined on the gripping block 9 at any angle, merely by adequately orienting sleeve 44 in jacket 43.

To process series of workpieces of another form than that chosen in the example described hereinabove, it suffices, in numerous cases, simply to change the jaws 36, 37 of the workpiece holder. According to the nature of the operations to be effected on a series of workpieces, bores for the insertion of the workpiece holder could be provided in a non-horizontal direction in another gripping block. The block 9 could also be fixed to a vertical or inclined member of another work station. The member of the work station to which the gripping block is fixed need not be a movable member. It could be a portion of the framework or even of the base of the work station. Finally, the work station need not form part of a machine tool; it could form part for example of a transfer printer.

A user already possessing a robot thus merely need acquire one gripping block, one corresponding bed plate of the workpiece holder and a set of jaws, like jaws 36, 37, to be mounted on this bed plate, to be able to feed automatically and with great precision the machines that he already possesses, conforming to the method according to the invention.

The apparatus according to the invention is particularly advantageous when the work station to be fed in numerically controlled. With respect to the robot, it will preferably be of the type progammable by memorization of the movements initially accomplished by hand.

The robot is not compelled to hold the workpiece holder permanently during processing a series of identical workpieces. If processing the workpieces of a series is relatively long and is effected in a single insertion position of the workpiece holder 17 in the gripping block 9, then the robot would advantageously leave the workpiece holder 17, and the time of processing the workpiece carried thereby be used to feed a second work station, identical with the represented one and also equipped with a gripping block, identical with the gripping block 9, a second workpiece holder, identical with the workpiece holder 17, and carrying a workpiece of the series, being inserted in this second gripping block. For the purpose of feeding such a second work station, the robot arm 15, after having left the workpiece holder 17 at the first work station, would be conveyed to the second work station, where clamp 16 would grip the second workpiece holder and take it away from the second station, together with the workpiece having been processed at the second work station. The robot arm 15 would then transfer the processed workpiece to the discharging station, cause the second workpiece holder to deliver the processed workpiece at that station and, after chain 20 has advanced one step, cause the second workpiece holder to grasp a further workpiece to be processed and feed it to the second work station in the manner disclosed hereinabove in relation with the represented work station. Finally, clamp 16 would leave the second workpiece holder and the robot arm 15 be conveyed back to the first work station, where clamp 16 would grip again the workpiece holder 17 and transfer it to the discharging station.

That pendular processing method is only then recommended, when the processing time of a workpiece is almost equal to the time used by the robot to carry out the different operations disclosed hereinabove to feed a second work station. But then the pendular processing method obviously has the advantage to substantially increase the production.

Figure 5:
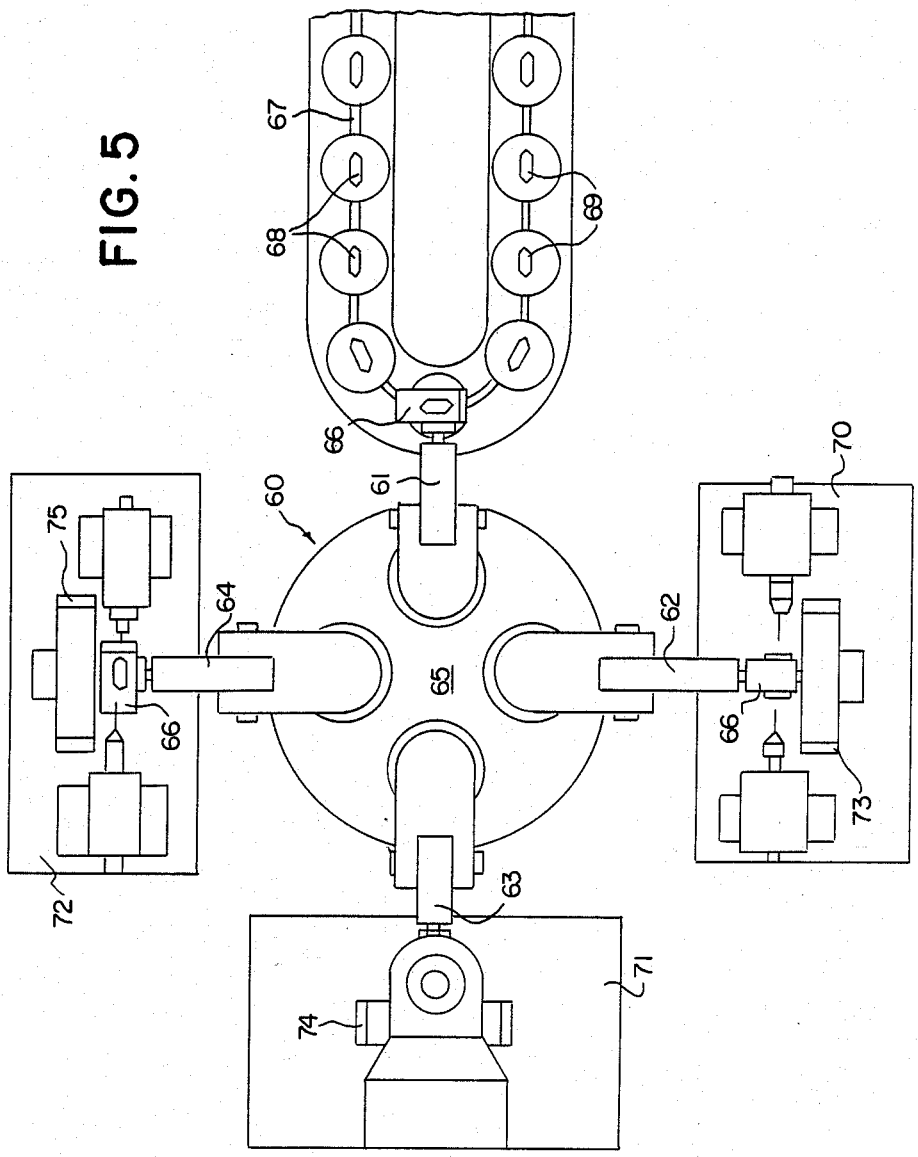
FIG. 5 is a plan view of the second embodiment.

When the workpieces of a series to be processed should be subjected to several different operations, it may be advantageous to practise the method according to the invention in accordance with a further example, which can be deducted from FIG. 5.

FIG. 5 shows a robot 60 having four arms 61, 62, 63, 64 mounted on a rotatable platform 65, which turns through 90° at each step. Each one of these four arms permanently holds a workpiece holder 66 differing, in principle, from the workpiece holder 17 of the first example only in the gripping jaws for the workpieces to be processed. The four workpiece holders 66 are identical. Around the robot 60 are disposed: a chain 67, which conducts the workpieces 68 to be processed to a charging station and carries away the processed workpieces 69 from a discharging station, and three different work stations 70, 71, 72. The position of chain 67 and stations 70, 71, 72 is chosen so that one of the arms 61, 62, 63, 64 of robot 60 is at least approximately opposite chain 67 and one of the stations 70, 71, 72 at each step of platform 65.

FIG. 5 is supposed to show the set represented at the beginning of any cycle of processing the workpieces 68. When platform 65 arrived in the position shown, at the end of the preceding cycle, the arm 61 conducted a processed workpiece to the discharging station, i.e. above a vacant receptacle of chain 67. Arm 61 then permitted the workpiece holder 66 that it carries to let the processed workpiece fall into said vacant receptacle, as in the first example. Afterwards, chain 67 moved one step forward and the arm 61 caused its workpiece holder 66 to grasp the workpiece 68 to be processed, which has just arrived at the charging station which, in this example too, coincides with the discharging station.

During the same motion of platform 65, arm 62 of robot 60 arrived opposite the work station 70, where it inserted the workpiece holder 66 that it carries in the gripping block 73 of this station, so as to submit the conducted workpiece to first processing operations. In the same way, arms 63 and 64 inserted their workpiece holder 66 in the gripping blocks 74 and 75 of the work stations 71 and 72, respectively, so as to continue and to complete the processing operations of the already partially processed workpieces that they carry.

Platform 65 advances one step by rotating through 90° when that of the operations described, which is the longest, is complete. At each step of platform 65, a completely processed workpiece is thus delivered to chain 67. The distribution to different work stations of the processing operations to be carried out on a workpiece obviously improves the production. The work flow at each work station is similar to that described in the first example for practising the method according to the invention. Workpiece holders and gripping blocks are also disposed as in this first example.

The number of work stations is obviously not limited to three. The robot need only have one more arm than the number of work stations.

I claim:

1. A method for automatically feeding by means of a conventional robot a standard work station with workpieces to be processed, comprising, in combination, the steps of:
   providing said work station with a gripping block precisely positioned thereon and having positioning and locking means;
   gripping at a charging station one of said workpieces by a workpiece holder with the aid of said robot releasably gripping said workpiece holder, said workpiece holder holding said one workpiece in a precise position with respect to said workpiece holder;
   transferring from said charging station to said work station said one workpiece held by said workpiece holder with the aid of said robot;
   feeding with the aid of said robot said work station with said workpiece holder holding said workpiece by setting said workpiece holder in engagement with said positioning and said locking means of said gripping block;
   activating said locking means, thereby causing said gripping block to hold said workpiece holder precisely positioned thereon;
   causing said work station to carry out processing of said one workpiece;
   causing said locking means of said gripping block to release said workpiece holder;
   removing by said robot said workpiece holder and said workpiece from said work station with said workpiece carried by said workpiece holder, when processing of the workpiece is complete;
   transferring said workpiece holder together with the processed workpiece carried thereby from said work station to a discharging station, and
   causing said workpiece holder to release the processed workpiece at said discharging station.

2. A method according to claim 1, wherein said robot momentarily releases said workpiece holder at said work station and feeds a second work station during processing of the workpiece at the first work station.

3. A method according to claim 1, wherein said robot holds said workpiece holder at said work station, further comprising the step of switching off control of said robot when said workpiece holder is locked on said gripping block and during all the processing of the workpiece at said work station.

4. A method according to claim 3, wherein said robot, before transferring said workpiece holder and said workpiece to said discharging station, feeds said workpiece holder and said workpiece to at least one further work station by setting said workpiece holder successively in engagement with positioning and locking means of gripping blocks provided at said at least one further work station.

5. An apparatus for automatically feeding by means of a conventional robot a standard work station with workpieces to be processed, comprising, in combination, a gripping block fixed to a member in said work station and having positioning and locking means;

a workpiece holder;

positioning means on said workpiece holder, said positioning means of said gripping block and said positioning means of said workpiece holder being complementary to each other and arranged, when engaging one another, to center and orient said workpiece holder in a predetermined angular position in said work station, said locking means of said gripping block securely maintaining said workpiece holder in said predetermined position;

a robot having means for releasably gripping said workpiece holder;

gripping means on said workpiece holder adapted to the shape and size of the workpieces of a series of workpieces to be processed, so as successively to grip each one of said workpieces at a predetermined position with respect to said positioning means, said workpiece holder being held by said releasable gripping means of said robot;

said robot comprising means for moving said workpiece holder without a workpiece, to a charging station in which the workpiece holder receives a workpiece while the workpiece holder remains held by the gripping means of the robot, and then for moving said workpiece holder carrying a workpiece, cyclically, first, from said charging station to a position in which the positioning means of the workpiece holder and of the gripping block are mutually engaged, and then from this latter position to the discharging station.

6. An apparatus according to claim 5, wherein said positioning means of said gripping block and of said workpiece holder comprise, for one positioning means, a centering element the end of which is frusto-conical, and for the other positioning means an opening adapted to receive said centering element, and abutting means limiting the depth of engagement of said centering element in said opening, said locking means of said gripping block being adapted to firmly grip said centering element within said opening.

7. An apparatus according to claim 6, wherein said centering element consists of a cylindrical shaft and said positioning means comprises at least a cylindrical pin, said gripping block having a bore adapted to receive said shaft, an annular portion of a wall of said bore being thin and elastically deformable by fluid pressure so as to constitute said locking means, and the gripping block having a crown of bushes, in each one of which said pin of said workpiece holder may be selectively engaged so as to fix the workpiece holder in different angular positions on said gripping block.

8. An apparatus according to claim 5, wherein said gripping block has means for increasing the gripping action of said workpiece holder on said workpiece.

9. An apparatus according to claim 5, wherein said workpiece holder comprises a bed plate carrying orienting pins and abutting means to limit the depth of engagement of said pins, said gripping means of said workpiece holder being removably mounted on said bed plate.

10. An apparatus according to claim 6, wherein said centering element consists of a cylindrical shaft and said positioning means comprises at least a cylindrical pin, said gripping block having a bore adapted to receive said shaft, and the gripping block having a crown of bushes, in each one of which said pin of said workpiece holder may be selectively engaged so as to fix the workpiece holder in different angular positions on said gripping block.

* * * * *